United States Patent [19]
Hotto

[11] Patent Number: 5,410,541
[45] Date of Patent: Apr. 25, 1995

[54] SYSTEM FOR SIMULTANEOUS ANALOG AND DIGITAL COMMUNICATIONS OVER AN ANALOG CHANNEL

[75] Inventor: Robert Hotto, La Jolla, Calif.

[73] Assignee: Ivon International, Inc., Santee, Calif.

[21] Appl. No.: 881,747

[22] Filed: May 4, 1992

[51] Int. Cl.⁶ .................................................. H04J 1/14
[52] U.S. Cl. ..................................... 370/76; 370/111; 375/216; 379/97
[58] Field of Search ............... 370/69.1, 76, 110.1, 370/110.3, 111; 455/45, 68, 70, 71; 375/82; 379/93, 97, 201, 354, 360

[56] References Cited

U.S. PATENT DOCUMENTS

| | | | |
|---|---|---|---|
| 1,968,106 | 7/1934 | Thierbach | 455/70 |
| 2,254,342 | 9/1941 | Zenner | 379/97 |
| 2,374,884 | 5/1945 | Newby et al. | 379/360 |
| 2,613,279 | 10/1952 | Hurault | 370/76 |
| 3,106,679 | 10/1963 | Friedrich | 455/70 |
| 3,436,487 | 4/1969 | Blane | 370/76 |
| 3,501,703 | 3/1970 | Baade | 328/165 |
| 3,648,174 | 3/1972 | Fukata | 455/70 |
| 3,845,391 | 10/1974 | Crosby | 455/45 |
| 4,064,367 | 12/1977 | O'Malley | 379/97 |
| 4,225,967 | 9/1980 | Miwa et al. | 455/68 |
| 4,280,020 | 7/1981 | Schnurr | 379/58 |
| 4,431,872 | 2/1984 | Edwards et al. | 379/351 |
| 4,512,013 | 4/1985 | Nash et al. | 370/69.1 |
| 4,521,647 | 6/1985 | Olson et al. | 379/351 |
| 4,523,311 | 6/1985 | Lee et al. | 370/69.1 |
| 4,689,760 | 8/1987 | Lee et al. | 370/110.3 |

OTHER PUBLICATIONS

Active-Filter Cookbook, Howard W. Sams & Company, pp. 205-207 Single-Chip Microprocessor Suppresses Unwanted Tone, John Miller, EDN Dec. 5, 1991.

*Primary Examiner*—Benedict V. Safourek
*Attorney, Agent, or Firm*—Thomas J. Tighe

[57] ABSTRACT

At a transmitting end, frequencies used to a construct a digital signal are substantially removed from an analog signal by a notch filter circuit to produce an interim signal which is then combined with the digital signal as by combining to produce a composite analog signal that is transmitted to a receiving end. At the receiving end the frequencies used to construct the digital signal are substantially removed from the composite analog signal by a notch filter circuit. In this way the digital signal can be transmitted simultaneously with the analog signal without errors that could be introduced by the analog signal, and with only a slight change to the frequency spectrum of the analog signal. This can be used in telephone communications for sending caller ID digital data over the same line carrying a voice signal. Caller ID data is sent FSK encoded and only those frequency used for the mark and the space are attenuated in the received voice signal before it reaches the telephone's speech circuit. For PSK encoded data method, a single notch filter removes the carrier frequency from the voice signal at the receiving end. In this way, the user is not subjected to the audible frequencies used to transmit the caller ID data, but the overall fidelity of the voice signal is only insignificantly reduced.

13 Claims, 2 Drawing Sheets

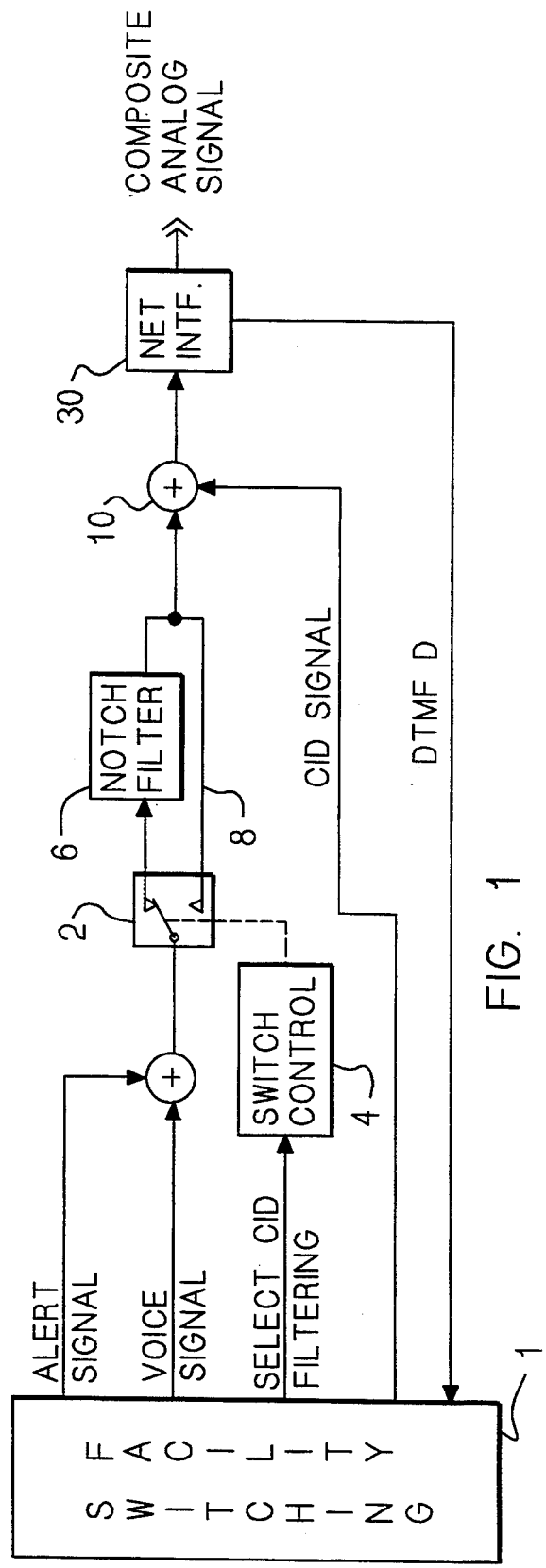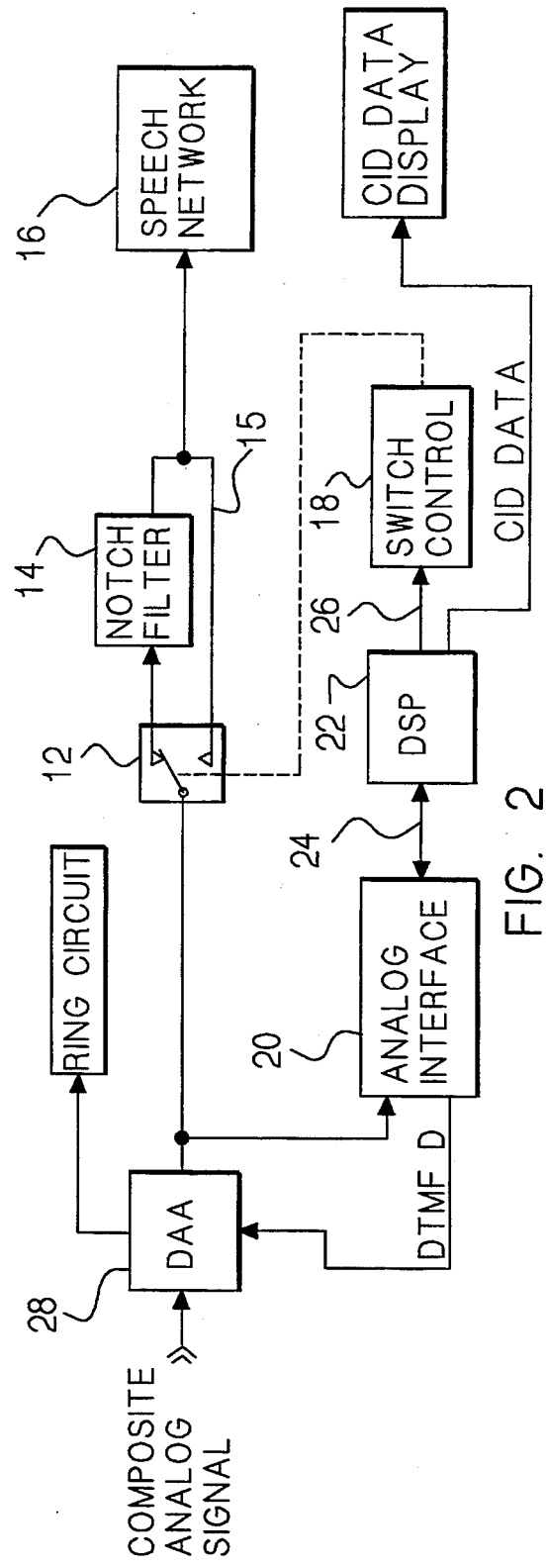

SYSTEM FOR SIMULTANEOUS ANALOG AND DIGITAL COMMUNICATIONS OVER AN ANALOG CHANNEL

BACKGROUND OF THE INVENTION

This invention relates in general to devices for providing simultaneous transmission of analog communication and sporadic bursts of digital data over a bandwidth limited analog channel, and in particular to such devices that remove from the band available for the analog communications only those frequencies necessary to accomplish the data transmissions and only during the data transmissions.

A need exists for a way to transfer, from time to time, bursts of digital data over an analog channel simultaneously with analog communications without degrading the fidelity of the analog communications except only slightly during the bursts of digital data. Such a need exists in the art of telephone communications, particularly with the introduction of a feature commonly called "caller identity delivery" also known as "caller i.d." (hereinafter sometimes referred to as "CID"). This feature provides a user with certain identifying information of a caller, such as telephone number and/or the name of the caller. This identifying information, i.e. data, is transmitted digitally from a telephone company to its users' telephone equipment via the same voice frequency channels used for voice communication for display on their respective equipment. In the case where the user is not using the telephone when a caller rings, the CID information is transferred between the first and second ring signals. The user can then view the information to decide whether to answer the telephone.

The techniques for transmitting digital data over an analog channel such as a voice frequency channel are well known in the art. For example transmission of the digital data can be, and is most commonly, accomplished using a technique called "FSK" or frequency shift keying. For another example, digital data can also be transmitted over such channels by a technique called "PSK" or phase shift keying. Both of these techniques utilize a portion of the frequency spectrum available on the channel.

A conflict can arise when a user has the CID feature and also has a telephone feature commonly called "call waiting." (The combination of the two features is commonly called "caller i.d. on call waiting" hereinafter sometimes referred to as "CID/CW"). If a user's equipment is connected to another party, the call waiting feature alerts the user to the presence of a waiting call by a distinctive audible indication. The user can then elect to receive the waiting call by a known keying operation. The conflict arises whenever the user is telephoned by a caller while the user is engaged in a telephone conversation with another party and the caller's CID information is transmitted to the user's receiver. The CID transmission takes place almost automatically after the user is alerted to the new call so that this information can be used to help decide whether to take the new call. Since both the analog signals of the conversation between the user and the other party, and the digital signals corresponding to the caller's CID information are transmitted over the same analog channel, there can be audible interference between the two while the CID information is being transmitted. The user and the other party involved in the conversation can be subjected to annoying and uncomfortable bursts of sound generated by the CID data transmission.

A heretofore system that has addressed this CID/CW problem uses a technique of muting all sound to the conversing parties while the caller i.d. information is being transmitted. This system has the advantage of providing an error free channel for the CID data communication, but it has a significant disadvantage in that it causes the conversation to be muted for the three to four seconds it takes to transmit the CID information.

Another heretofore proposed system for CID/CW involves using a spread spectrum signal for CID data transfer mixed with the voice signal. This system is too expensive and too complicated to implement. Moreover, the spread spectrum signal will be heard as noise to the user reducing the clarity of the voice communication during CID transfer.

The present invention avoids the muting without creating noise and is able to transmit CID information over a channel with no interruption in voice communication and without subjecting the conversing parties to the aforesaid annoying and uncomfortable burst of sound. It has the further advantage of not reducing the band of frequencies available on the channel for voice communications except only slightly during the brief CID data transmissions. It also provides an error free path for the data communications.

Other advantages and attributes are either discussed in, or can be gleaned from a reading of, the text hereinafter.

Previous methods of achieving simultaneous transmission of speech and data have been disclosed in U.S. Pat. Nos. 4,523,311, 4,512,013 and 4,280,020. These inventions multiplex the data and the analog signal thereby continuously degrading the quality of the analog signal.

SUMMARY OF THE INVENTION

An object of this invention is to maintain the maximum possible fidelity of an analog signal traversing an analog channel while providing error free data communications during spurious intervals without muting the analog signal.

A further object of this invention is to provide a system for transmitting a digital signal simultaneously with an analog signal without errors that could be introduced by the analog signal, and with only a slight change to the frequency spectrum of the analog signal.

A further object of this invention is to provide a system for clear and error free intermittent data communications by switching into the system notch filters that attenuate the data transfer frequencies, and after the data communications are complete, the notch filters are switched out of the system thereby providing maximum analog fidelity of the voice signal.

These and other objects are achieved by a system for simultaneously transmitting analog and digital signals via an analog channel comprising a transmitting end comprising means for removing from the analog signal those frequency components used to construct the digital signal resulting in a first interim signal, the removal of said frequency components being for the purpose of preventing errors which could be caused by the presence of said frequency components in the analog signal, means for producing a second interim signal comprising at least a combining of the first interim signal and the digital signal, and means for transmitting the second interim signal; and a receiving end comprising means for receiving the second interim signal, and means for removing from the second interim signal those frequency components used to construct the digital signal.

BRIEF DESCRIPTION OF THE DRAWINGS

FIG. 1 is a functional block diagram illustrating a portion an embodiment of this invention directed to a CID/CW application, a portion that resides in a telephone company central switching facility.

FIG. 2 is a functional block diagram illustrating a user's telephone instrument portion of the embodiment directed to a CID/CW application.

DESCRIPTION OF THE PREFERRED EMBODIMENT

Figure 3:
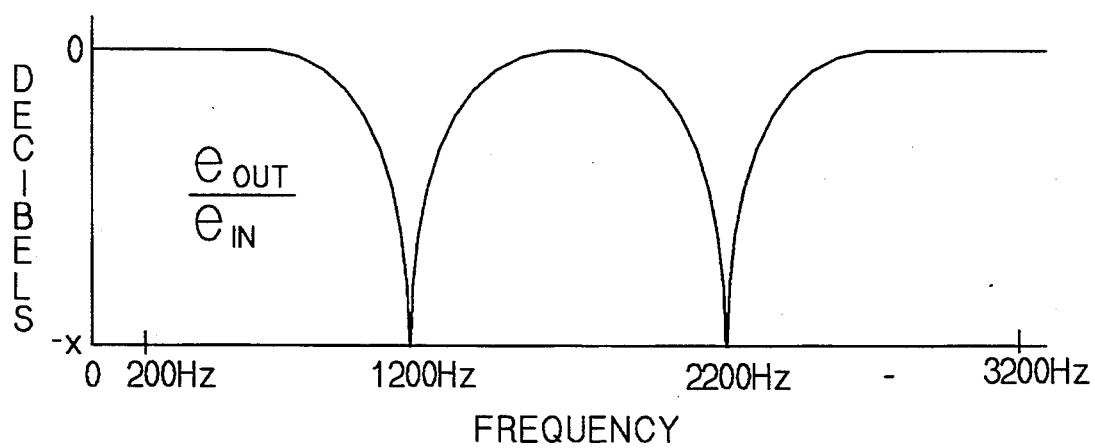
FIG. 3 is a frequency response graph generally illustrating the frequency characteristics of the notch filters of this invention.

Referring to FIG. 1, the portion of a CID/CW system according to this invention that resides in a telephone company's central switching facility 1 is illustrated to have a switching means comprising a switch 2 and a switch control circuit 4. The switch is illustrated diagrammatically and is preferably a conventional semiconductor analog signal switch integrated with the switch control circuit. The switch provides two alternative paths for an incoming analog voice signal ("VOICE SIGNAL") originating from a telephone instrument (not shown) remote from the switching facility: a first path through a notch filter circuit 6, preferably a pair of serially connected notch filters, and a second path 8 that bypasses the notch filter circuit. Depending on the setting of the switch the incoming voice signal, either filtered or unprocessed, is communicated to one input of a signal adder 10, the output of which is amplified if necessary and transmitted via telephone lines to a second telephone instrument (partially illustrated in FIG. 2) also remote from the switching facility.

Referring again to FIG. 1, the switch control 4 is caused to select the notch filter path for the incoming voice signal at times when CID data is being transmitted to the second telephone instrument by the switching facility 1. The CID data is transmitted by combining a corresponding CID signal ("CID SIGNAL") with the processed incoming voice signal by means of adder 10. The notch filter circuit 6 substantially removes the notch frequency or frequencies from the frequency spectrum available on the channel for voice communication. The frequencies removed are those that are used by the switching facility to construct the CID data signals. For example, if the switching facility uses an FSK method of sending the CID data, then the notch filter circuit effectively removes from the spectrum available for voice communications those frequencies, plus and minus a tolerance, that are used for the FSK "mark" and "space" signals. In a PSK method, a single notch filter substantially makes the carrier frequency unavailable for voice communications. This is done in order to avoid errors in the transmission of the CID signal components of the composite analog signal ("COMPOSITE ANALOG SIGNAL") sent to the second telephone instrument. Errors could occur if the voice signal contained relatively strong components of the CID transmission frequencies.

Referring again to FIG. 1, for illustrative purposes only the switch control 4 selects the notch filter path in response to a signal ("SELECT CID FILTERING") indicating the start of the CID transmission. It should be recognized that the signal SELECT CID FILTERING is not necessarily one signal but may be a composite of a plurality of signals which combine to accomplish the aforesaid filtering of the incoming voice signal. The means for generating SELECT CID FILTERING or its equivalent is conventionally available at switching facilities 1 implementing the CID/CW feature or can be created thereat from conventional circuits by one of ordinary skill in the pertinent art.

Referring to FIG. 2, the composite analog signal sent by the switching facility is received by the user's telephone equipment and communicated to a switch 12 which provides two alternative paths for the incoming signal: a path through a notch filter circuit 14 and a path 15 that bypasses the notch filter circuit. Depending on the setting of the switch the incoming signal is either processed, preferably by a pair of serially connected notch filters 14, or alternately unprocessed before it is communicated to a conventional speech network 16. If CID data is not present, then the switch is configured to bypass the notch filter circuit. The switch is preferably a conventional semiconductor analog signal switch integrated with a switch control circuit 18.

Conventionally the user's telephone instrument is informed by the telephone company's switching facility that CID data is going to be sent by means of a special alerting tone comprising a 2130 Hz tone and a 2750 Hz tone sent simultaneously for approximately 50 milliseconds. This tone is used to alert the user's instrument that the CID data is forthcoming. When the user's instrument recognizes the alerting tone, it responds by sending back to the switching facility an acknowledgment tone conventionally called a "DTMF D" tone for 50 to 55 milliseconds. The alerting and acknowledgment tones are both well known in the art of telephone communication.

Referring to FIGS. 1 and 2, according to this invention, the two tones comprising the alerting tone and their simultaneous duration are recognized by means of an analog interface 20 and a digital signal processor ("DSP") 22. The composite analog signal received by the user's instrument is communicated to the analog interface which preferably is an integrated circuit such as the TLC32046 which is a wide-band analog interface circuit manufactured by Texas Instruments and conventional support circuits. By well known techniques, the analog interface quantized the composite analog signal and presents the quantized data to a serial port 24. Communicating with this port is the digital signal processor which is preferably a TMS320C40 processor, and conventional support circuits, manufactured by Texas Instruments, and which is programmable by well known techniques to perform fourier analysis on quantized signals such as the alerting tone and the CID signals which follow the alerting tone. Using the TLC32046 and the TMS320C40 in combination to analyze analog signals in real time is well known. In response to the alerting tone, the DSP communicates a signal 26 to the switch control 18 which causes the notch filter 14 path to be selected for the incoming composite analog signal. After the CID data has been sent the DSP removes the signal 26 which causes the bypass path 15 to be selected by the switch 12. Also in response to the alerting tone, the DSP causes the analog interface, by well known techniques, to send the DTMF D acknowledgement signal back to the switching facility.

In operation, the notch filter circuit 14 effectively removes from the incoming composite signal those frequencies used by the switching facility to construct the CID data signals. For example, if the switching facility combined FSK encoded CID data in the composite analog signal, those frequencies, plus and minus a tolerance, that were used in the FSK technique are effectively removed from the composite signal before it reaches the speech network. In a PSK method, a single notch filter removes the carrier frequency. In this way, the user is not subjected to the audible frequencies used to transmit the CID data, but the overall fidelity of the voice signal is only insignificantly reduced.

Referring again to FIGS. 1 and 2, the composite analog signal communicated between the telephone company's switching facility and a user's telephone instrument is conditioned by a DAA (Data Access Arrangement) circuit 28 required by the Federal Communications Commission (FCC) and permits bilateral communication between the switching facility and the user's telephone equipment over the same channel. These DAA circuits are conventional and can be made from a DS2249PH manufactured by Dallas Semiconductor. These DAA circuits provide a bi-directional signal interface and necessary circuit isolation. At the switching facility end conventional network interface circuits 30 are used to accomplish the same end, bilateral communications over the same channel.

Referring to FIG. 3, illustrated is the general form of frequency response curves for the notch filters adapted to be centered at 1200 Hz and 2200 Hz respectively. These are the frequencies arbitrarily selected for "mark" and "space" frequencies for an FSK method of transferring the CID data. They are certainly not the only pair of frequencies that could have been selected without departing from the spirit and scope of this invention. The requirement for CID/CW as set by the telephone regulating authorities is to maintain the overall present telephone speech fidelity from 200 to 3200 Hz. The present invention only degrades the speech path during the 3 to 4 second interval of the actual CID data transmission.

While the foregoing discussion centered around the application of this invention to sending CID data simultaneously with a voice signal, this invention is equally useful for other telecommunication applications. For example in the art of cellular telephone communications, the voice communications are muted temporarily when a cellular telephone instrument passes from one cell to another cell in order for the new cell to send necessary frequency information to the instrument. The system described herein would eliminate the need to mute. The only variation between the system described with reference to FIGS. 1-3 and an embodiment for cellular telephone communications is an RF (radio frequency) stage between the switching facility and the user's instrument comprising basically means for imposing the composite analog signal on an RF carrier and transmitting same, means for receiving the RF carrier and detecting the composite analog signal, and means for doing the request and acknowledge handshaking between the switching facility and instrument, if necessary.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A system for simultaneously communicating an analog voice signal and a voiceband digital signal from a sender to a receiver comprising:
    (a) means, at the sender, for filtering from a voice signal to be transmitted those frequency components used to construct a digital signal to be transmitted resulting in a first interim signal, removal of said frequency components being for the purpose of preventing errors which could be caused by the presence of voice components in the digital signal,
    (b) means, at the sender, for producing a second interim signal comprising the sum of the first interim signal and the digital signal,
    (c) means, at the sender, for transmitting the second interim signal,
    (d) means, at the receiver, for receiving the second interim signal,
    (e) means, at the receiver, for filtering from the received second interim signal those frequency components used to construct the digital signal,
    (f) selectable means, at the sender, for bypassing the means at the sender for filtering, the second interim signal comprising the voice signal whenever said selectable means is selected, and
    (g) selectable means, at the receiver, for bypassing the means at the receiver for filtering.

2. The system according to claim 1 further comprising:
    (a) means for selecting the bypass means at the sender when there is no digital signal to be transmitted, and
    (b) means for selecting the bypass means at the receiver when there is no digital signal being transmitted.

3. The system according to claim 1 wherein the means at the sender for filtering comprises a notch filter circuit with center frequencies equal to the frequency components of the digital signal.

4. The system according to claim 1 wherein the means at the receiver for filtering comprises a notch filter circuit with center frequencies equal to the frequency components of the digital signal.

5. The system according to claim 1 further comprising:
    (a) means for de-selecting the bypass means at the receiver,
    (b) means for de-selecting the bypass means at the receiver, and
    (c) means for synchronizing the de-selection of the bypass means at the receiver with the de-selection of the bypass means at the sender with the transmission of a voiceband digital signal.

6. The system according to claim 5 wherein the means for synchronizing comprises:
    (a) a first signal transmitted to the receiver by the sender as a forewarning to the receiver that a digital signal is forthcoming, and
    (b) a second signal transmitted to the sender by the receiver in response to the first signal as an acknowledgement of receipt of the first signal.

7. The system according to claim 6 wherein the means for de-selecting the bypass means at the receiver comprises a switch responsive to the first signal, and wherein the means for de-selecting the bypass means at the sender comprises a switch responsive to the second signal.

8. A system for simultaneously communicating an analog voice signal and a voiceband digital signal from a sender to a receiver comprising:
   (a) means, at the sender, for filtering from a voice signal to be transmitted those frequency components used to construct a digital signal to be transmitted resulting in a first interim signal, removal of said frequency components being for the purpose of preventing errors which could be caused by the presence of voice components in the digital signal,
   (b) means, at the sender, for producing a second interim signal comprising the sum of the first interim signal and the digital signal,
   (c) means, at the sender, for transmitting the second interim signal,
   (d) means, at the receiver, for receiving the second interim signal,
   (e) means, at the receiver, for filtering from the received second interim signal those frequency components used to construct the digital signal,
   (f) selectable means, at the sender, for bypassing the means at the sender for filtering, the second interim signal comprising the voice signal whenever said selectable means is selected,
   (g) selectable means, at the receiver, for bypassing the means at the receiver for filtering,
   (h) means, at the sender, for transmitting a first signal as a forewarning to the receiver that a digital signal is forthcoming,
   (i) means, at the receiver, for transmitting back to the sender a second signal in response to the first signal as an acknowledgement of receipt of the first signal,
   (j) means, at the receiver, for de-selecting the bypass means at the receiver in response to the first signal, and
   (k) means, at the sender, for de-selecting the bypass means at the sender in response to the second signal.

9. The system according to claim 8 wherein the first signal comprises one or more frequencies having a predetermined duration, and further comprising:
   (a) means, at the receiver, for quantizing signals received from the sender, and
   (b) means, at the receiver, for analyzing the quantized signals to recognize said one or more frequencies and determine their respective durations.

10. In a communication channel over which a sender transmits analog voice signals and from time to time sends voiceband digital signals having a predetermined frequency construct to a receiver, each transmission of a digital signal being initiated by an acknowledgement signal transmitted from the receiver to the sender in response to an alert signal transmitted from the sender to the receiver, the alert signal being indicative that a digital signal is forthcoming, a system by which the sender can simultaneously transmit voice signals and digital signals comprising:
   (a) means, at the sender and having an input, for transmitting a signal at its input over said channel;
   (b) means, at the sender and having an input, for combining a signal at its input and the digital signal to produce a combined signal, and for communicating the combined signal to the input of the means for transmitting;
   (c) a first signal path, at the sender, comprising means for filtering from a voice signal to be transmitted each frequency component of the predetermined frequency construct, and for communicating the filtered voice signal to the input of the means for combining; and
   (d) a second signal path, at the sender, by which the voice signal bypasses the first signal path and is communicated to the input of the means for combining;
   (e) means, at the sender, for selecting the first signal path for the voice signal, the second signal path being normally selected;
   (f) means, at the receiver, for receiving signals from said channel;
   (g) a first signal path, at the receiver, comprising means for filtering from a received signal each frequency component of the predetermined frequency construct;
   (h) a second signal path, at the receiver, by which a received signal bypasses the first signal path;
   (i) means, at the receiver and at least partially responsive to an alert signal from the sender, for selecting the first signal path for the received signal, the second signal path being normally selected; and
   (j) means, at the receiver, for transmitting an acknowledgment signal over the channel to the sender in response to an alert signal from the sender.

11. The system according to claim 10 wherein the means at the sender for filtering comprises a notch filter circuit having a center frequency at each frequency of the predetermined frequency construct.

12. The system according to claim 10 wherein the means at the receiver for filtering comprises a notch filter circuit having a center frequency at each frequency of the predetermined frequency construct.

13. The system according to claim 10 further comprising:
   (a) means, at the receiver, for quantizing signals received via the channel, and
   (b) means for analyzing the quantized signals to recognize the alert signal and the digital signals.

* * * * *